(12) United States Patent
Millán Mejía

(10) Patent No.: US 12,510,709 B2
(45) Date of Patent: Dec. 30, 2025

(54) WAVEGUIDE STRUCTURE AND METHOD OF MANUFACTURE

(71) Applicant: SMART PHOTONICS HOLDING B.V., Eindhoven (NL)

(72) Inventor: Alonso Jesús Millán Mejía, Eindhoven (NL)

(73) Assignee: SMART PHOTONICS HOLDING B.V., Eindhoven (NL)

(*) Notice: Subject to any disclaimer, the term of this patent is extended or adjusted under 35 U.S.C. 154(b) by 191 days.

(21) Appl. No.: 18/341,485

(22) Filed: Jun. 26, 2023

(65) Prior Publication Data

US 2023/0333320 A1 Oct. 19, 2023

Related U.S. Application Data

(63) Continuation of application No. PCT/EP2021/086854, filed on Dec. 20, 2021.

(30) Foreign Application Priority Data

Dec. 31, 2020 (GB) .................................... 2020848

(51) Int. Cl.
- *G02B 6/126* (2006.01)
- *G02B 6/12* (2006.01)
- *G02B 6/122* (2006.01)

(52) U.S. Cl.
CPC ........... *G02B 6/126* (2013.01); *G02B 6/1223* (2013.01); *G02B 2006/12085* (2013.01)

(58) Field of Classification Search
None
See application file for complete search history.

(56) References Cited

U.S. PATENT DOCUMENTS

| | | | |
|---|---|---|---|
| 6,330,378 B1* | 12/2001 | Forrest | G02B 6/12004 372/50.21 |
| 6,647,032 B1* | 11/2003 | Lee | H01S 5/026 372/24 |
| 6,934,313 B1 | 8/2005 | Deacon | |
| 2009/0074020 A1* | 3/2009 | Matsui | H01S 5/026 438/32 |
| 2010/0311195 A1* | 12/2010 | Matsui | B82Y 20/00 438/31 |

OTHER PUBLICATIONS

United Kingdom Combined Search and Examination report dated Apr. 25, 2022, for United Kingdom Application No. GB2020848.4.
(Continued)

*Primary Examiner* — Jerry Rahll
(74) *Attorney, Agent, or Firm* — EIP US LLP

(57) ABSTRACT

A waveguide structure comprising: a substrate; a waveguide layer on the substrate; a cladding layer in contact with a first side of the waveguide layer, the waveguide layer between the cladding layer and the substrate; and a first waveguide modifier layer comprising a first material for modifying a waveguide function of the waveguide layer, the first waveguide modifier layer in contact with the cladding layer and having a width along a first axis less than a width, parallel to the first axis, of the cladding layer, the first axis perpendicular to a second axis corresponding with a light propagation direction within the waveguide layer. There is a method of manufacturing a waveguide structure.

20 Claims, 11 Drawing Sheets

(56) References Cited

OTHER PUBLICATIONS

International Search Report and Written Opinion dated Apr. 5, 2022 for International PCT Patent Application No. PCT/EP2021/086854.
European search report dated Sep. 17, 2025 for European Application No. 25175920.5.

\* cited by examiner

WAVEGUIDE STRUCTURE AND METHOD OF MANUFACTURE

CROSS-REFERENCE TO RELATED APPLICATIONS

This application is a continuation under 35 U.S.C. § 120 of International Application No. PCT/EP2021/086854, filed Dec. 20, 2021 which claims priority to United Kingdom Application Number GB 2020848.4, filed Dec. 31, 2020, under 35 U.S.C. § 119(a). Each of the above-referenced patent applications is incorporated by reference in its entirety.

BACKGROUND

Semiconductor waveguide structures are known. Properties of waveguide structures can be chosen differently according to their intended use. For example, a waveguide structure may have a length along the direction of light propagation in accordance with a desired optical length.

DETAILED DESCRIPTION

Examples described herein relate to a waveguide structure and a method of manufacturing a waveguide structure.

Depending on the application, a waveguide structure may be required to provide a particular optical length for the wavelength of light it is to be used for. The optical length is the product of the geometric length of the path followed by light and the refractive index the light is subject to when following that path. The optical length may be varied by varying the length (in the direction of light propagation) or the width of the waveguide structure, for example. However, varying the physical dimensions of the waveguide structure may require careful consideration of the positional arrangement of the various components of a photonic integrated circuit (PIC), which may reduce flexibility in PIC design.

The examples described herein comprise one or more waveguide modifier layers which for example modify the effective refractive index for certain modes of light in a waveguide layer (in which light is confined and propagates). This means that the optical length for those modes can be tuned without the need to vary the physical dimensions of the waveguide structure. This gives greater flexibility in PIC design as compared to the case where the physical dimensions of the waveguide structure are varied in order to tune the optical length. Also, the one or more waveguide modifier layer can be arranged to affect particular modes of light within the waveguide layer and not substantially to affect other modes in the same manner, as desired. This enables further flexibility in the applications of the waveguide structure.

Figure 1:
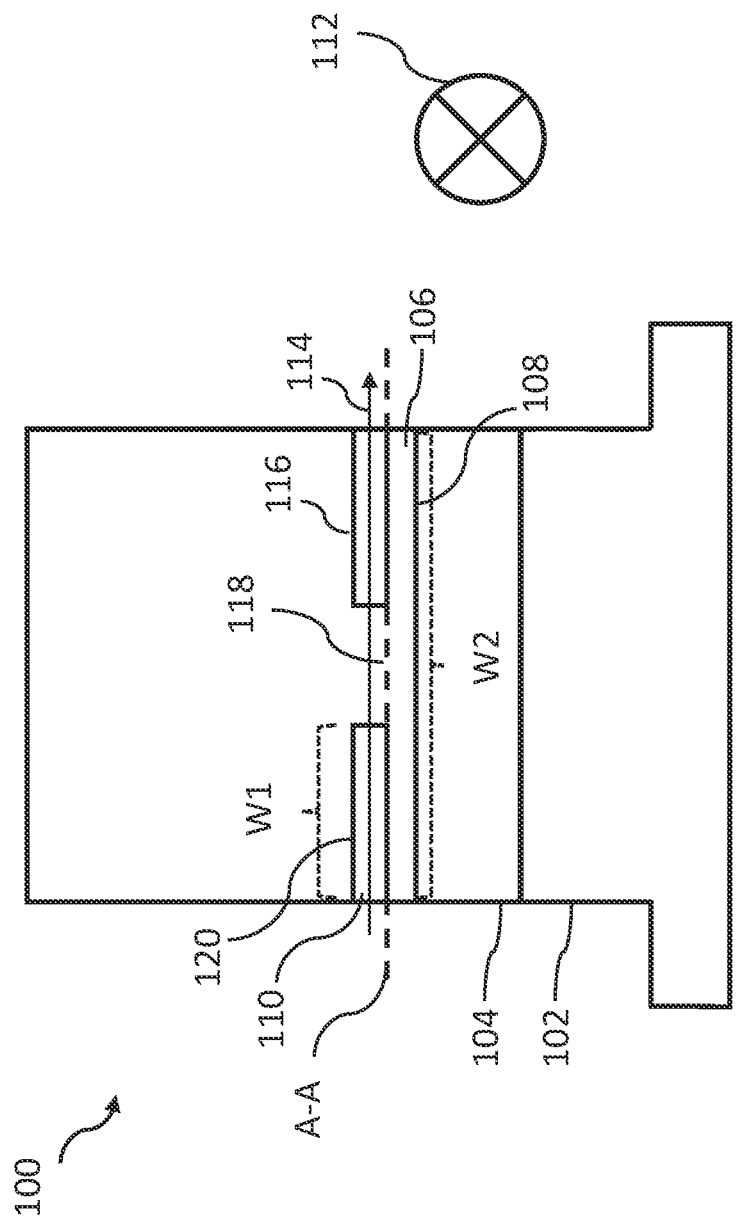
FIG. 1 illustrates schematically a side cross-section of a first waveguide structure according to examples.

FIG. 1 illustrates schematically a side cross-section of a waveguide structure 100 according to an example. The waveguide structure 100 comprises a substrate 102 and a waveguide layer 104 on the substrate 102. In some examples, the substrate 102 comprises a so-called III-V semiconductor compound such as Indium Phosphide (InP), gallium arsenide (GaAs), gallium nitride (GaN) or gallium antimonide (GaSb). In other examples, the substrate comprises a Nitride based material or a Silicon based material. The following examples are in the context of the substrate comprising InP.

In the examples described herein the substrate 102 comprises mainly InP. In some examples, the substrate 102 is purely InP (within acceptable purity tolerances). In other examples, the substrate 102 comprises other materials such as dopants or impurities with the material comprising at least 99% InP. For example, the substrate 102 is doped with a dopant material so that the substrate is considered n-doped or the substrate 102 is doped with a dopant material so that the substrate 102 is considered p-doped, or the substrate 102 is doped with a dopant material so that the substrate 102 is considered semi-insulating.

The waveguide layer 104 comprises a material which has a higher refractive index than the material of the substrate 102. For example, the waveguide layer 104 comprises Indium Gallium Arsenide Phosphide (InGaAsP). More generally, in some examples, the waveguide layer 104 comprises (Al)InGaAs(P). The elements indicated in the parentheses can be interchangeable and the composition of the different elements is selected depending on the desired function. For example, the composition of Ga and As in InGaAs can be selected according to the desired bandgap. In some examples, the waveguide layer 104 is a layer of (Al)InGaAs(P). In other examples, the waveguide layer 104 comprises a plurality of sub-layers. In some such examples, the waveguide layer 104 comprises a (Al)InGaAs(P)/(Al)InGaAs(P) multiple quantum well structure in contact with the substrate 102. In some examples, the sub-layers are between 5 and 20 nanometres thick. The sub-layer stack of the waveguide layer 104 has a band gap selected in accordance with the desired application of the waveguide structure 100. In examples, the waveguide layer 104 has a thickness (in the vertical direction with respect to FIG. 1) of 500 nanometres (although, it will be appreciated that the thickness and the composition of the waveguide layer 104 depends on the desired application).

The bandgap and therefore, as will be appreciated by those skilled in the art, the refractive index of the InGaAsP, for example, can be tuned. In some examples, the bandgap of the InGaAsP of the waveguide layer 104 is tuned to a wavelength of 1250 nanometres. In other examples, the wavelength to which the bandgap is tuned is different.

The waveguide layer 104 is for guiding light. In use, light propagates within the waveguide layer 104 and is confined within the waveguide layer 104, for example in vertical and horizontal direction as shown in FIG. 1, due to reflection at the boundaries of the waveguide layer 104. The waveguide layer 104 has a refractive index higher than the refractive index of material in contact with the waveguide layer 104 at the boundaries at which confinement of light is desired. For example, due to this refractive index difference at the boundaries at which confinement of light is desired, total internal reflection takes place when the angle of incidence at these boundaries of the waveguide layer 104 is greater than the critical angle. In this manner, the waveguide layer 104 guides the propagation of the light. For a particular optical mode to propagate in the waveguide layer 104, it is desired that the light reflected at the boundaries of the waveguide layer 104 fulfils the conditions for constructive interference, as will be appreciated by the skilled person.

For example, particular optical modes of light are desired to propagate through the waveguide layer 104 depending on the desired application of the waveguide structure 100. The direction in which the optical modes propagate within the waveguide layer 104 is herein referred to as the light propagation direction. The light propagation direction is the general direction in which the energy of the optical mode travels through the waveguide layer 104 and is not necessarily, for example, the direction defined by the angle of incidence at a boundary of the waveguide layer 104.

The waveguide structure 100 comprises a cladding layer 106 in contact with a first side 108 of the waveguide layer 104, the waveguide layer 104 between the cladding layer 106 and the substrate 102. The first side 108 of the waveguide layer 104 is the side opposite to the side of the waveguide layer 104 in contact with the substrate 102. With reference to the orientation shown in FIG. 1, the first side 108 of the waveguide layer 104 is hereafter referred to as the top side 108 of the waveguide layer 104.

For example, the cladding layer 106 comprises a III-V semiconductor compound such as Indium Phosphide (InP), gallium arsenide (GaAs), gallium nitride (GaN) or gallium antimonide (GaSb), depending on the substrate used. In these examples, the cladding layer 106 comprises mainly InP. As for the substrate 102, this means that the material of the cladding layer 106 comprises mainly InP. As in the case of the substrate 102, the material of the cladding layer 106 comprises at least 99% InP, and is, for example, considered intrinisic (un-doped), n-doped, p-doped or semi-insulation. In some examples, where the desired application is with active PIC components, the cladding layer is doped (e.g. p-doped) to enable transmission of electrical power, for example. In the examples described herein, the cladding layer 106 comprises intrinsic InP.

The waveguide structure 100 comprises a first waveguide modifier layer 110 comprising a first material for modifying a waveguide function of the waveguide layer 104. The presence of the waveguide modifier layer 110 modifies the way in which light propagates within the waveguide layer 104 as compared to when the waveguide modifier layer 104 is not present. In the following examples, the presence of the first waveguide modifier layer (which comprises the first material) modifies the effective refractive index of the waveguide layer 104. As used herein, the effective refractive index is the refractive index which the light propagating within the waveguide layer 104 experiences. The effective refractive index is not necessarily the refractive index of the waveguide layer in isolation (e.g. the refractive index of the material comprised in the waveguide layer 104), for example. Other material in the vicinity of the waveguide layer 104 can also influence the refractive index experienced by light propagating within the waveguide layer 104 since part of the optical mode overlaps with this material. Depending upon what material is in the vicinity of the waveguide layer 104, the effective refractive index for light within the waveguide layer 104 can be different. For example, the effective refractive index depends on the waveguide structure 100 as a whole. The skilled person will appreciate that the effective refractive index depends on parameters including the wavelength of light and also depending on the particular optical mode in question.

By introducing a layer comprising the first material (e.g. the first waveguide modifier layer 110) close to the waveguide layer 104, the effective refractive index for light propagating within the waveguide layer 104 can be modified. As used herein, the modified effective refractive index is the effective refractive index as modified due to the presence of a waveguide modifier layer such as the first waveguide modifier layer 110.

For example, when the first waveguide modifier layer 110 is present, light propagates within the portion of the waveguide layer 104 underneath the first waveguide modifier layer 110 (with respect to the orientation shown in FIG. 1) as if the refractive index it is subject to is the modified effective refractive index. For example, an optical mode propagating through the waveguide layer 104 for which constructive interference occurs in the portion of the waveguide layer 104 underneath the first waveguide modifier layer 110 propagates as if the refractive index it is subject to is the modified effective refractive index. Modifying the effective refractive index does not mean changing physically the waveguide layer 104 in any manner. Instead, the effective refractive index is the refractive index according to which the light propagates in the portion of the waveguide layer 104 underneath the first waveguide modifier layer 110 due to the presence of the first waveguide modifier layer 110 close to the waveguide layer 104.

The first material has a different refractive index to the material of the cladding layer 106. In the examples described herein, the waveguide modifier layer 110 comprises the same material (the first material) as the waveguide layer 104. In other examples, the first material is a different material to the material of the waveguide layer 104. In some examples, the first material is different to the material of the waveguide layer 104, and has substantially (within acceptable tolerances) the same refractive index as the material of the waveguide layer 104. In some examples, the first material has a higher refractive index than the refractive index of the material of the waveguide layer 104. In other examples, the first material has a lower refractive index than the refractive index of the material of the waveguide layer 104.

The first waveguide modifier layer 110 is in contact with the cladding layer 106. The first waveguide modifier layer 110 has a width (W1) along a first axis 114 less than a width (W2), parallel to the first axis 114, of the cladding layer 106. The first axis 114 is perpendicular to a second axis (indicated by reference numeral 202 in FIGS. 2 and 3) corresponding with a light propagation direction within the waveguide layer 104. In the examples of FIG. 1, a side-cross section is shown such that the light propagation direction is into the page, as indicated by symbol 112.

As a consequence of the width of the waveguide modifier layer 110 along the first axis 114 being less than the width of the cladding layer 106 parallel to the first axis 114, there is a region of the waveguide layer 104 which has the first material above it (in the orientation shown in FIG. 1), and a region of the waveguide layer 104 which does not have the first material above it. Accordingly, the effective refractive index for the optical modes for which constructive interference occurs in the region of the waveguide layer 104 with the first material above it is substantially (within acceptable tolerances) different to the effective refractive index for the optical modes for which constructive interference occurs in the region of the waveguide layer 104 with no first material above it.

The skilled person will appreciate that different modes of light will have constructive interference peaks at different locations of the waveguide layer 104 along a direction parallel to the first axis 114. The first waveguide modifier layer 110 can be positioned and dimensioned in terms of width along the first axis 114 according to the particular modes of light for which the effective refractive index is to be modified.

In the examples of FIG. 1, the first waveguide modifier layer 110 is positioned above a left hand side portion of the waveguide layer 104 (with respect to the orientation shown in FIG. 1). Therefore, the effective refractive index for the modes of light for which constructive interference occurs in that left hand side portion of the waveguide layer 104 will be modified in these examples. It should be noted that the position of the first waveguide modifier layer 110 along the first axis 114 is not limited to these examples. The number, position, size or shape of waveguide modifier layers is not limited to the examples shown in FIG. 1. As one of many examples, the first waveguide modifier layer 110 is positioned above the centre (with respect to a direction parallel to the first axis 114) of the waveguide layer 104.

In the examples of FIG. 1, the waveguide structure 100 comprises a plurality of waveguide modifier layers on the first axis 114 comprising the first material. The plurality of waveguide modifier layers on the first axis 114 comprise the first waveguide modifier layer 110. The plurality of waveguide modifier layers on the first axis 114 are in contact with the cladding layer 106 and spaced apart from one another. More specifically, in the examples of FIG. 1, there are two waveguide modifier layers on the first axis 114 including the first waveguide modifier layer 110. In other examples, the waveguide modifier layers on the first axis are positioned and dimensioned in terms of width along the first axis 114 differently to the examples of FIG. 1, depending upon the application of the waveguide structure 100. In some examples, there are three or more waveguide modifier layers on the first axis 114 in contact with the cladding layer 106 and spaced apart from one another.

In the particular examples of FIG. 1, the waveguide structure 100 comprises the first waveguide modifier layer 110 and a second waveguide modifier layer 116 on the first axis 114 comprising the first material for modifying the waveguide function of the waveguide layer, the first and the second waveguide modifier layers on the first axis 114 in contact with the cladding layer 106 and spaced apart from one another. The second waveguide modifier layer 116 is positioned above the right hand side portion of the waveguide layer 104 (with respect to the orientation shown in FIG. 1). Accordingly, the modes of light for which constructive interference occurs in the waveguide layer 104 in the left hand side and the right hand side portions will experience a modified effective refractive index.

Figure 8:
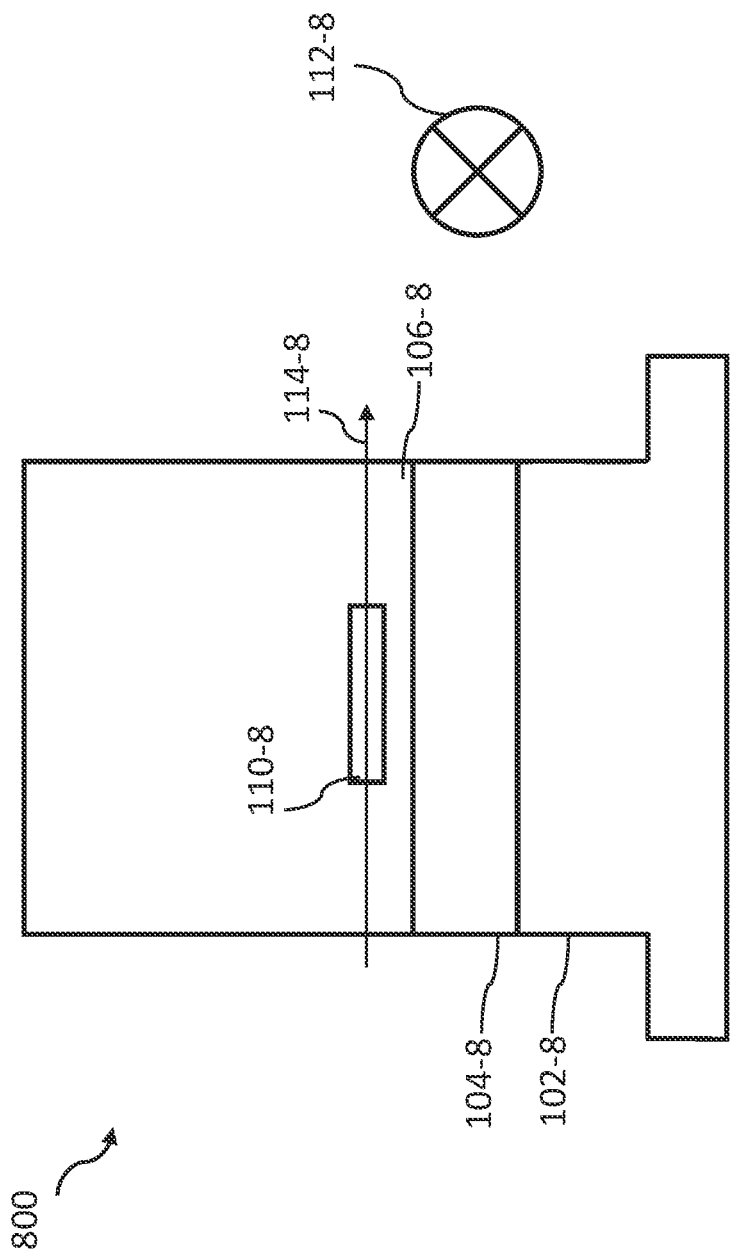
FIG. 8 illustrates schematically a side cross-section of a third waveguide structure according to examples.

In other examples, there is only one waveguide modifier layer. For example, FIG. 8 illustrates schematically a side cross-section of a waveguide structure 800 according to examples. In FIG. 8, features corresponding to those shown in FIG. 1 are labelled with similar reference numerals with the additional numeral "-8" added at the end. The waveguide structure 800 comprises only the first waveguide modifier layer 110-8 on the first axis 114-8 and does not comprise other waveguide modifier layers on the first axis 114-8. In these examples, the first waveguide modifier layer 110-8 is positioned centrally with respect to the waveguide layer 104-8 in the direction of the first axis 114-8. The position and width of the first waveguide modifier layer 110-8 is selected based on the particular application of the waveguide structure 800.

In the examples described herein, the waveguide structure 100 comprises a second material in contact with one or more portions 118 of a side of the cladding layer 106 overlapping the top side 108 of the waveguide layer 104, the one or more portions 118 not in contact with the first material. The side of the cladding layer 106 which overlaps the top side 108 of the waveguide layer 104 is the top side of the cladding layer 106 as shown in FIG. 1. In other words, the one or more portions 118 are the portions of the cladding layer 106 which do not have the first material above them as shown in FIG. 1. The second material, therefore, is positioned on the first axis 114 in contact with the first waveguide modifier layer 110. In examples with a plurality of waveguide modifier layers on the first axis 114, the second material fills the space between the plurality of waveguide modifier layers on the first axis 114.

In the examples described herein, the cladding layer comprises the second material. In other examples, the second material is a different material to the material of the cladding layer 106. The second material extends up to the same height as a top side of the first waveguide modifier layer 110. In other examples, the second material is omitted. For example, the first waveguide modifier layer 110 forms a boundary with air or other material along a position along the first axis 114.

Furthermore, in the examples described herein, the second material is in contact with a side 120 of the first waveguide modifier layer 110 overlapping the top side 108 of the waveguide layer 104. The side 120 is the top side 120 of the first waveguide modifier layer 110. In examples comprising a plurality of waveguide modifier layers on the first axis 114, the second material is in contact with respective top sides of the waveguide modifier layers of the plurality of waveguide modifier layers on the first axis 114. In some examples, there is a material other than the second material in contact with the top side 120 of the first waveguide modifier layer 110. In some examples, a material with a different concentration of dopant is in contact with the top side 120 of the first waveguide modifier layer 110. In some examples, there is a material in contact with the top side 120 of the first waveguide modifier layer 110 with a substantially (within acceptable tolerances) homogeneous dopant concentration. In other examples, a top section in contact with the top side 120 of the first waveguide modifier layer 110 has a concentration gradient of dopant. For example, the dopant concentration in the top section increases with distance from the waveguide layer 104.

In some particular examples, the top section comprises (not shown in the Figures) an intrinsic semiconductor layer (e.g. InP with a thickness of 170 nanometres) in contact with the top side 120 of the first waveguide modifier layer 110, a first p-doped top section layer in contact with a top surface of the intrinsic semiconductor layer (e.g. p-doped InP of thickness 170 nanometres) and a second p-doped top section layer (e.g. p-doped InP with a higher dopant concentration than the first p-doped top section layer with a thickness of 1000 nanometres) in contact with a top surface of the first p-doped top section layer. In some such examples, the top section comprises a contact layer in contact with a top surface of the second p-doped top section layer. The contact layer is for injecting charge carriers into the semiconductor structure.

In other examples, there is no semiconductor material in contact with the top side 120 of the first waveguide modifier layer 110. For example, the top side 120 of the first waveguide modifier layer 110 forms a boundary with air, dielectric material, metal or magnetic material.

Figure 2:
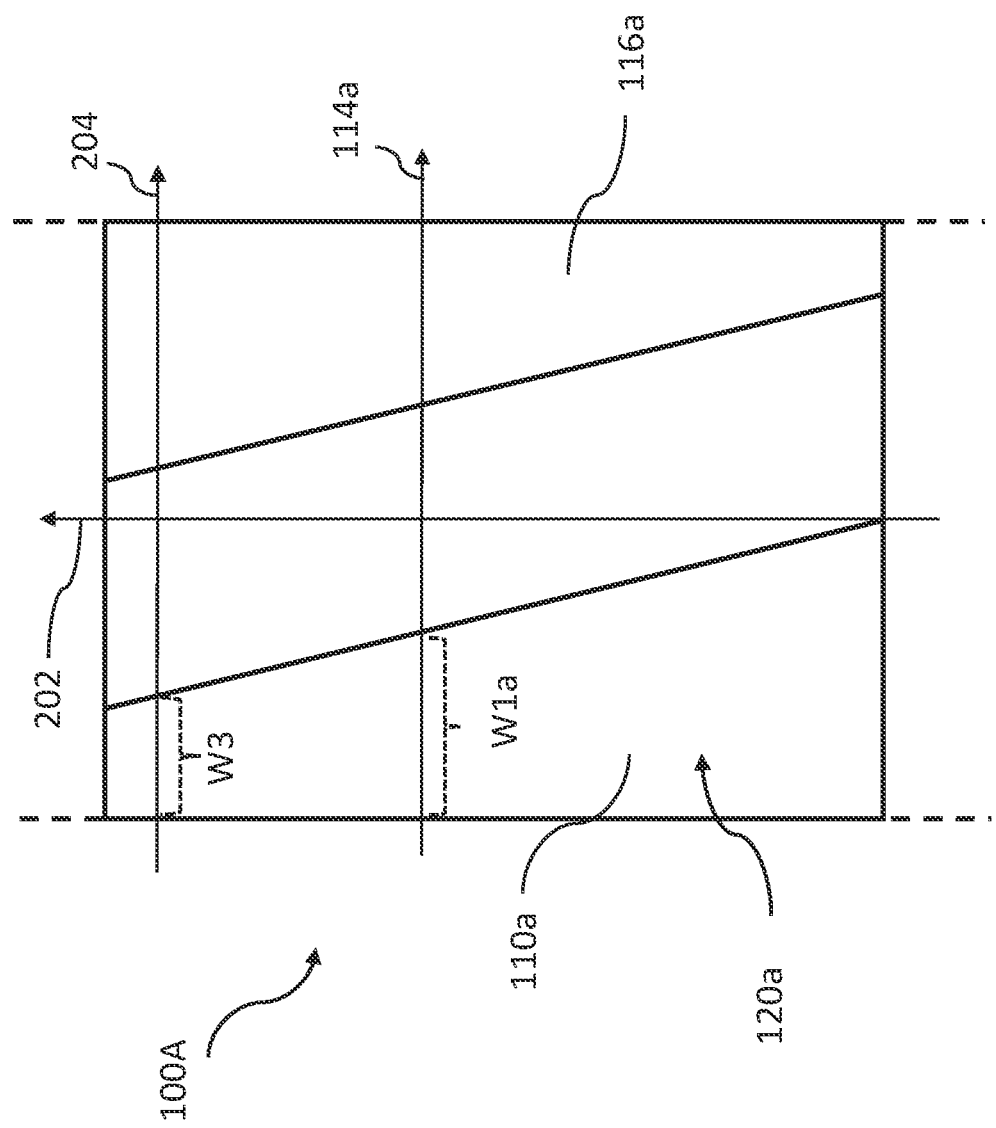
FIG. 2 illustrates schematically a plan cross-section of the first waveguide structure according to a first set of examples.

FIG. 2 illustrates schematically a plan view cross-section of a waveguide structure 100A according to examples. The waveguide structure 100A illustrates specific examples of the waveguide structure 100 shown in FIG. 1. The cross-section of FIG. 2 is taken along line A-A shown in FIG. 1, at the top surface 120 of the first waveguide modifier layer 110. In FIG. 2, the specific examples of the features shown in FIG. 1 are labelled with similar reference numerals with the letter "a" added at the end.

The second axis corresponding with the light propagation direction within the waveguide layer 104 is shown in FIG. 2 and labelled with reference numeral 202. In the examples of FIG. 2, the first waveguide modifier layer 110*a* has a width (W3) along a third axis 204 different to the width (W1*a*) of the first waveguide modifier layer 110*a* along the first axis 114*a*. The third axis 204 is perpendicular to the second axis 202 and spaced from the first axis 114*a*. In other words, the third axis 204 is at a different position with respect to the second axis 202 than is the first axis 114*a*. In this manner, the width of the first waveguide modifier layer 110*a* tapers with respect to position along the second axis 202.

In the examples of FIG. 2, the width of the second waveguide modifier layer 116*a* on the first axis 114*a* also tapers with respect to position along the second axis 202. In these examples, the amount by which the width of the first waveguide modifier layer 110*a* tapers is substantially (within acceptable tolerances) the same as the amount by which the width of the second waveguide modifier layer 116*a* tapers. In other examples, the widths of the first waveguide modifier layer 110*a* and the second waveguide modifier layer 116*a* taper differently (or one width tapers while the other does not, for example). In some examples where the width of the first waveguide modifier layer 110*a* tapers, there is no further waveguide modifier layers.

For example, the described taper is selected in accordance with the particular modification of the effective refractive index for the light propagating in the waveguide layer 104*a* that is desired. In the example of FIG. 2, the taper can be considered to be linear in that there is a linear transition from one width to a different width of the modifier layer. However, in other examples a change in width of the first waveguide modifier layer 110*a* can be non-linear, for example stepped, depending on the desired application.

Figure 3:
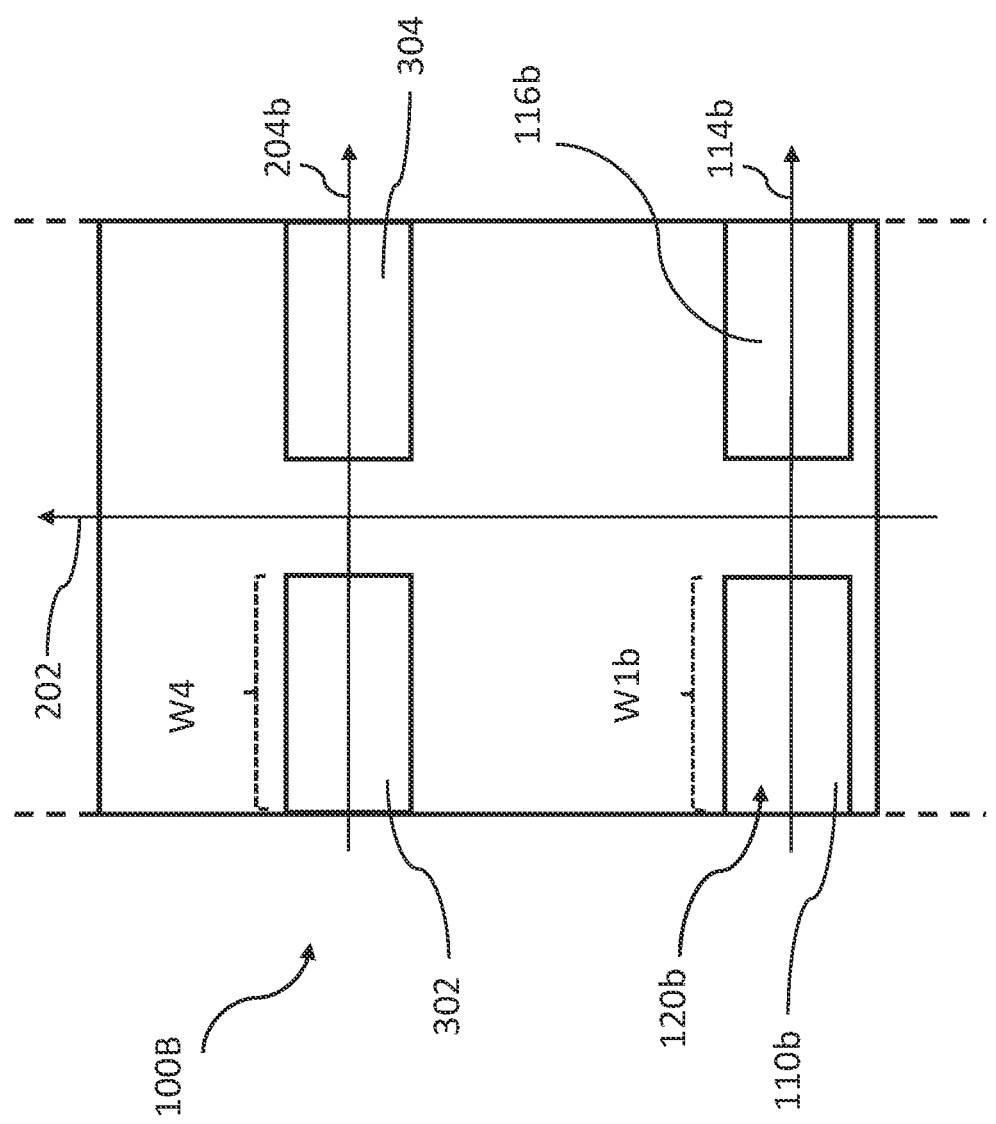
FIG. 3 illustrates schematically a plan cross-section of the first waveguide structure according to a second set of examples.

FIG. 3 illustrates schematically a plan view cross-section of a waveguide structure 100B according to examples. The waveguide structure 100B illustrates specific examples of the waveguide structure 100 shown in FIG. 1. The cross-section of FIG. 3 is taken along the line A-A shown in FIG. 1, at the top surface 120 of the first waveguide modifier layer 110. In FIG. 3, features corresponding to those described above are labelled with similar reference numerals with the letter "b" added at the end.

The waveguide structure 100B comprises a third waveguide modifier layer 302 comprising the first material. The third waveguide modifier layer 302 is in contact with the cladding layer 106*b*. The third waveguide modifier layer 302 is located on the third axis 204*b*. In these examples, the width (W4) of the third waveguide modifier layer 302 along the third axis 204*b* is less than the width, parallel to the third axis 204*b*, of the cladding layer 106*b*. In the examples of FIG. 3, the width (W1*b*) of the first waveguide modifier layer 110*b* is substantially (within acceptable tolerances) the same as the width (W4) of the third waveguide modifier layer 302 (the width being measured along the first axis 114*b* in the case of the first waveguide modifier layer 110*b*, and along the third axis 204*b* in the case of the third waveguide modifier layer 302, which is parallel to the first axis 114*b*). The examples of FIG. 3 may be used where filtering of certain optical modes is desired.

Figure 9:
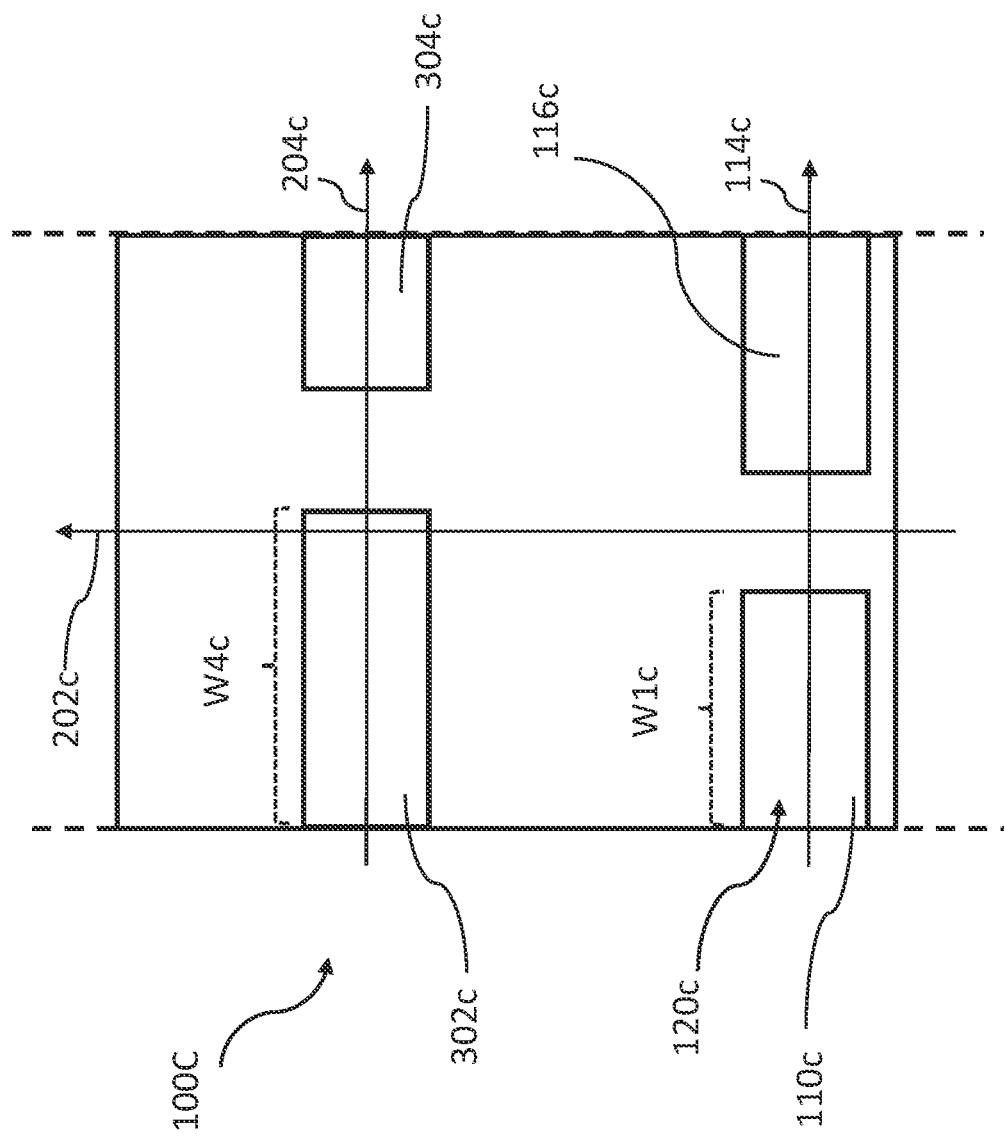
FIG. 9 illustrates schematically a plan cross-section of the first waveguide structure according to a third set of examples.

FIG. 9 illustrates schematically a side cross-section of a waveguide structure 100C. In FIG. 9, features corresponding to those described above are labelled with the same reference numerals with the letter "c" added at the end. In these examples, the width (W1*c*) of the first waveguide modifier layer 110*c* is different to the width (W4*c*) of the third waveguide modifier layer 302*c*. In examples, the third waveguide modifier layer 302*c* has any width in accordance with the intended application of the waveguide structure in question. In the examples of FIG. 3, the position of the first waveguide modifier layer 110*b* is aligned with the position of the third waveguide modifier layer 302 with respect to a direction parallel to the first axis 114*b*. In other examples, the first waveguide modifier layer 110*b* and the third waveguide modifier layer 302 are not so aligned.

Referring again to FIG. 3, in these examples, the waveguide structure 100B comprises a plurality of waveguide modifier layers on the third axis 204*b* comprising the first material, in contact with the cladding layer 106*b* and spaced apart from one another. The plurality of waveguide modifier layers on the third axis 204*b* comprise the third waveguide modifier layer 302. More specifically, in the examples of FIG. 3, the waveguide structure 100B comprises a fourth waveguide modifier layer 304 on the third axis 204*b* comprising the first material for modifying the waveguide function of the waveguide layer, the third and the fourth waveguide modifier layers in contact with the cladding layer and spaced apart from one another. In other examples, the waveguide structure 100B comprises only the third waveguide modifier layer 302 on the third axis 204*b* (and no other waveguide modifier layers). In some examples, the waveguide structure 100B comprises more than two waveguide modifier layers on the third axis 204*b* spaced apart from one another.

Figure 10:
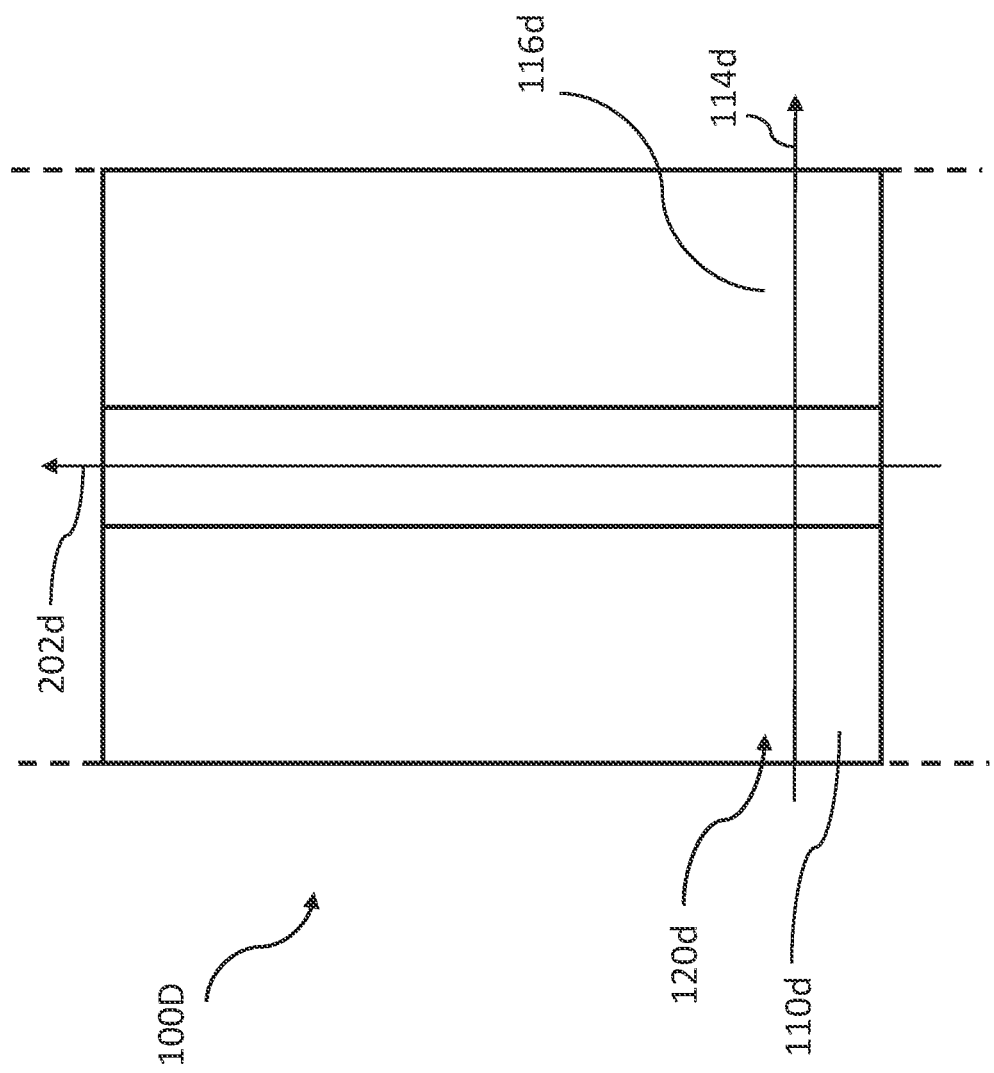
FIG. 10 illustrates schematically a plan cross-section of the first waveguide structure according to a fourth set of examples.

FIG. 10 illustrates schematically a side cross-section of a waveguide structure 100D according to examples. In FIG. 10, features corresponding to those described above are labelled with the same reference numerals with the letter "d" added at the end. In these examples, the waveguide structure 100D comprises only the first waveguide modifier layer 110*d* and the second waveguide modifier layer 116*d*. In these examples, the first waveguide modifier layer 110*d* and the second waveguide modifier layer 116*d* extend along the entire length of the waveguide structure 100D. In these examples, the width of the first waveguide modifier layer 110*d* in a direction parallel to the first axis 114*d* and the width of the second waveguide modifier layer 116*d* in a direction parallel to the first axis 114*d* does not change with respect to position along the second axis 202*d*.

Various examples of one or more waveguide modifier layers have been described. In the described examples, the space above the cladding layer 106 which is not covered by the first material is filled with the second material along the entire length of the waveguide structure parallel to the second axis. For example, in the case of waveguide structure 100A, the space between the first waveguide modifier layer 110 and the second waveguide modifier layer 116 on the first axis 114 contains the second material. For example, in the case of the waveguide structure 100B, the space between the first waveguide modifier layer 110b, the second waveguide modifier layer 116b on the first axis 114b, the third waveguide modifier layer 302 and the fourth waveguide modifier layer 304 on the third axis 204b is filled with the second material. The space in the same plane as the waveguide modifier layers not containing the first material contains the second material.

Referring again to FIG. 1, the waveguide structure 100 represents examples of what may be referred to as a deep waveguide structure. For example, in order to manufacture a deep waveguide structure, such as the waveguide structure 100, material is removed to form sides of the waveguide structure parallel to the second axis 202, starting from the top section, and beyond a top surface of the substrate 102.

Figure 4:
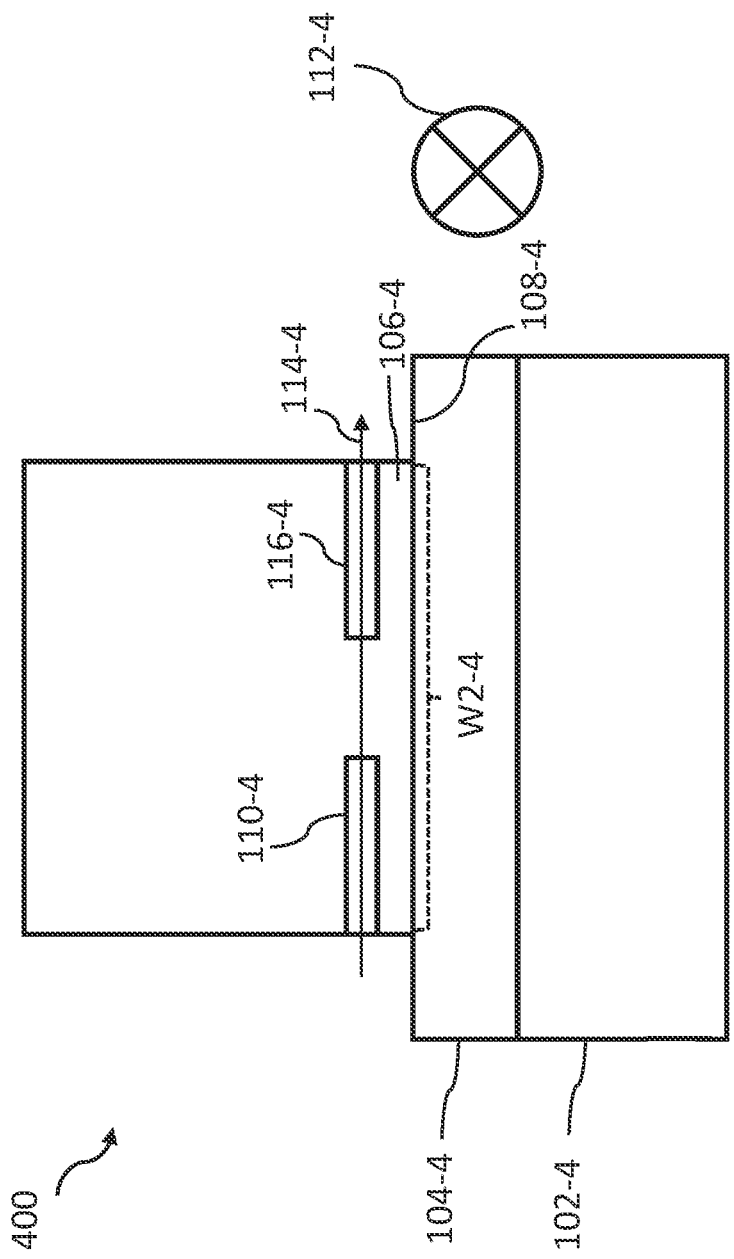
FIG. 4 illustrates schematically a side cross-section of a second waveguide structure according to examples.

FIG. 4 illustrates schematically a side cross-section of a waveguide structure 400 according examples. In FIG. 4, features corresponding to those shown in FIG. 1 are labelled with similar reference numerals with the additional numeral "-4" added at the end. The waveguide structure 400 may comprise any combination of the features described above in relation to the waveguide structure 100, except that the waveguide structure 400 is what may be referred to as a shallow waveguide structure. For example, in order to manufacture a shallow waveguide structure, such as the waveguide structure 400, material is removed to form sides of the waveguide structure parallel to the second axis 202, starting from the top section, and at least until a top surface of the waveguide layer 104-4 without removing all of the waveguide layer 104-4 down to its bottom surface (for example, material is removed until slightly below the top surface of the waveguide layer 104-4).

In the waveguide structure 400, parts of the top side 108-4 of the waveguide layer 104-4 are not covered by the cladding layer 106-4 and the waveguide layer 104-4 is wider as compared to the deep waveguide structure 100. The skilled person will appreciate that the deep waveguide structure 100 or the shallow waveguide structure 400 may be used depending on the desired light confinement within the waveguide layer 104-4 and/or the desired modes of light propagating within the waveguide layer 104-4. The skilled person will also appreciate that a deep waveguide structure may be manufactured using etching methods. A shallow waveguide structure may be desired where lower electron hole non-radiative recombination is desired. This is because etching away less of the waveguide layer may produce less damage to the surface of the waveguide layer and reduce non radiative recombination due to defects in the damaged material. This may be desired for applications such as amplifiers and detectors. A shallow waveguide structure also has less of the surface of the waveguide layer that is etched. This can mean lower optical losses in a shallow waveguide structure, and a shallow waveguide structure may be desired in view of this, depending on the application.

On the other hand, a deep waveguide structure can offer greater lateral confinement (in a direction parallel to the first axis 114-8) and may be used in view of this characteristic, depending on the application. For example, greater lateral confinement may result in different tuning characteristics of the optical modes. In some examples, a deep waveguide structure may provide flexibility in PIC design due to a smaller width of the waveguide layer and smaller bend radius for changing the direction of the propagation of light.

Modifying the effective refractive index using waveguide modifier layers as described facilitates the optical length of a waveguide structure to be tuned without a need to alter the physical dimensions of the waveguide structure (e.g. length in the light propagation direction). This allows much greater flexibility in the design of PICs as compared to, for example, varying the length of the waveguide structures in accordance with the desired optical length.

Furthermore, the effective refractive index can be tuned for particular modes of light positioned at different positions along a direction parallel to the first axis 114 within the waveguide layer 104. Therefore, the principles elucidated by the described examples facilitate the effective refractive index to be varied for the differently positioned modes of light in a direction parallel to the first axis 114 within the waveguide layer 104.

Various examples of waveguide structures have been described above. However, the number, size(s), shape(s) and arrangement of the waveguide modifier layers is not limited to the described examples. The waveguide structure may comprise any number, shape and arrangement of waveguide modifier layers in a manner so that, at least at one position in a direction parallel to the second axis 202, a waveguide modifier layer has a width, parallel to the first axis 114, less than a width, parallel to the first axis 114 of the cladding layer 106. In this manner, the effective refractive index can be modified for those modes located in the waveguide layer 104 along a direction parallel to the first axis 114 underneath the first material. Accordingly, numerous different patterns of waveguide modifier layers can be provided depending upon the particular application of the waveguide structure.

The distance between the waveguide layer 104 and the first waveguide modifier layer 110 is selected according to a desired magnitude by which the waveguide function of the waveguide layer 104 is to be modified. This distance is along a direction perpendicular to the first axis 114 and perpendicular to the second axis 202. In other words, this distance is defined by the thickness of the cladding layer 106 between the first waveguide modifier layer 110 and the waveguide layer 104. The closer a waveguide modifier layer is to the waveguide layer 104, the greater the modification of the effective refractive index of the waveguide layer 104. For the greatest modification of the effective refractive index, the waveguide modifier layers is positioned as close to the waveguide layer 104 as permitted by manufacturing tolerances. For example, the distance between the first waveguide modifier layer 110 and the waveguide layer 104 is around 30 nanometres. For example, if the waveguide modifier layer 110 is defined using dry etching techniques, it is desired that the cladding layer 106 is thick enough to compensate variation on the etching rate such that the waveguide layer 104 is not affected by the etching.

In some examples, the thickness of the waveguide modifier layers affects the magnitude of the modification of the effective refractive index at a position parallel to the first axis 114 in the waveguide layer 104 above which the waveguide modifier layers in question are present. Accordingly, in some examples, the thickness of one or more of the waveguide modifier layers is selected in accordance with the desired magnitude of the modification of the effective refractive index. In some examples, the thickness of the waveguide layers is 30 nanometres.

In some examples, further waveguide modifier layers are provided at different distances from the waveguide layer 104 in a direction perpendicular to the first axis 114 and perpendicular to the second axis 202. The further waveguide modifier layers can be positioned so as to modify the effective refractive index of the desired modes of light. As discussed above, the distance of a waveguide modifier layer from the waveguide layer 104 affects the magnitude by which the effective refractive index is modified. Accordingly, the effective refractive index for different modes of light can be modified to varying degrees.

In some examples, the waveguide modifier layers at a particular distance from the waveguide layer 104 are close to or in contact with waveguide modifier layers at a distance from the waveguide layer 104 different to that particular distance. In other examples, the waveguide modifier layers at a particular distance from the waveguide layer 104 are spaced apart in a direction perpendicular to the first axis 114 and perpendicular to the second axis 202 from other waveguide modifier layers.

Figure 11:
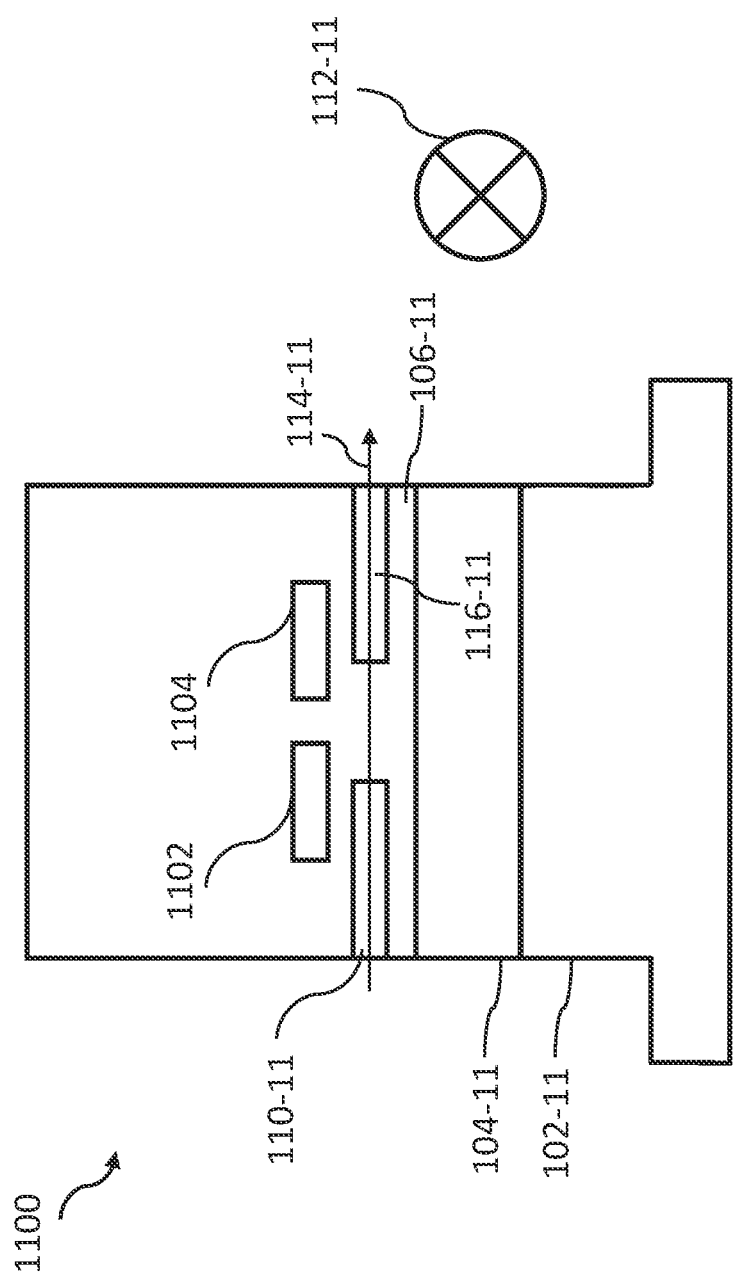
FIG. 11 illustrates schematically a side cross-section of a third waveguide structure according to examples.

FIG. 11 illustrates schematically a side cross-section of a waveguide structure 1100 according to examples. In FIG. 11, features corresponding to those shown in FIG. 1 are labelled with similar reference numerals with the additional numeral "-11" added at the end. The waveguide structure 1100 comprises any combination of the features of the examples of waveguide structure 100 described above. In some examples, the waveguide structure 1100 comprises any combination of features of the examples of waveguide structure 400 described above. In addition, in these examples, the waveguide structure 1100 comprises waveguide modifier layers at a distance from the waveguide layer 104-11 (perpendicular to the first axis 114-11 and perpendicular to the second axis corresponding to a direction (as indicated by 112-11) of light propagation) different to the first waveguide modifier layer 110-11. In these examples, the waveguide structure 1100 comprises a fifth waveguide modifier layer 1102 and a sixth waveguide modifier layer 1104 at a distance from the waveguide layer 104-11 further away than the first waveguide modifier layer 110-11 and the second waveguide modifier layer 116-11. In other examples, there may be one or more waveguide modifier layers at any number of distances from the waveguide layer 104-11, according to the intended application.

In the examples of FIG. 11, the space between the waveguide modifier layers at different distances from the waveguide layer 104-11 comprises the second material. In some examples, the waveguide modifier layers at a first distance from the waveguide layer 104-11 comprise a different material to the waveguide modifier layers at a second distance from the waveguide layer 104-11. The number, size(s), shape(s), arrangement and material(s) of the various waveguide modifier layers is selected according to the application of the waveguide structure 1100.

Various examples of arrangements of the waveguide modifier layers are described above. In addition, in some examples in accordance with the claims, waveguide modifier layers may be arranged so that they repeat (along a direction parallel to the first axis and/or the second axis) periodically with a periodicity selected depending on the application. For example, the periodicity is selected to correspond to a particular structure (e.g. a photonic crystal). Periodicity may be included for applications such as to provide filters, reflectors, etc, in addition to modifying the effective refractive index.

The boundaries of the described examples of the waveguide structure may be in contact with air, dielectric material, metal or magnetic material. In some examples, the waveguide structure comprises layers not described above.

Figure 5:
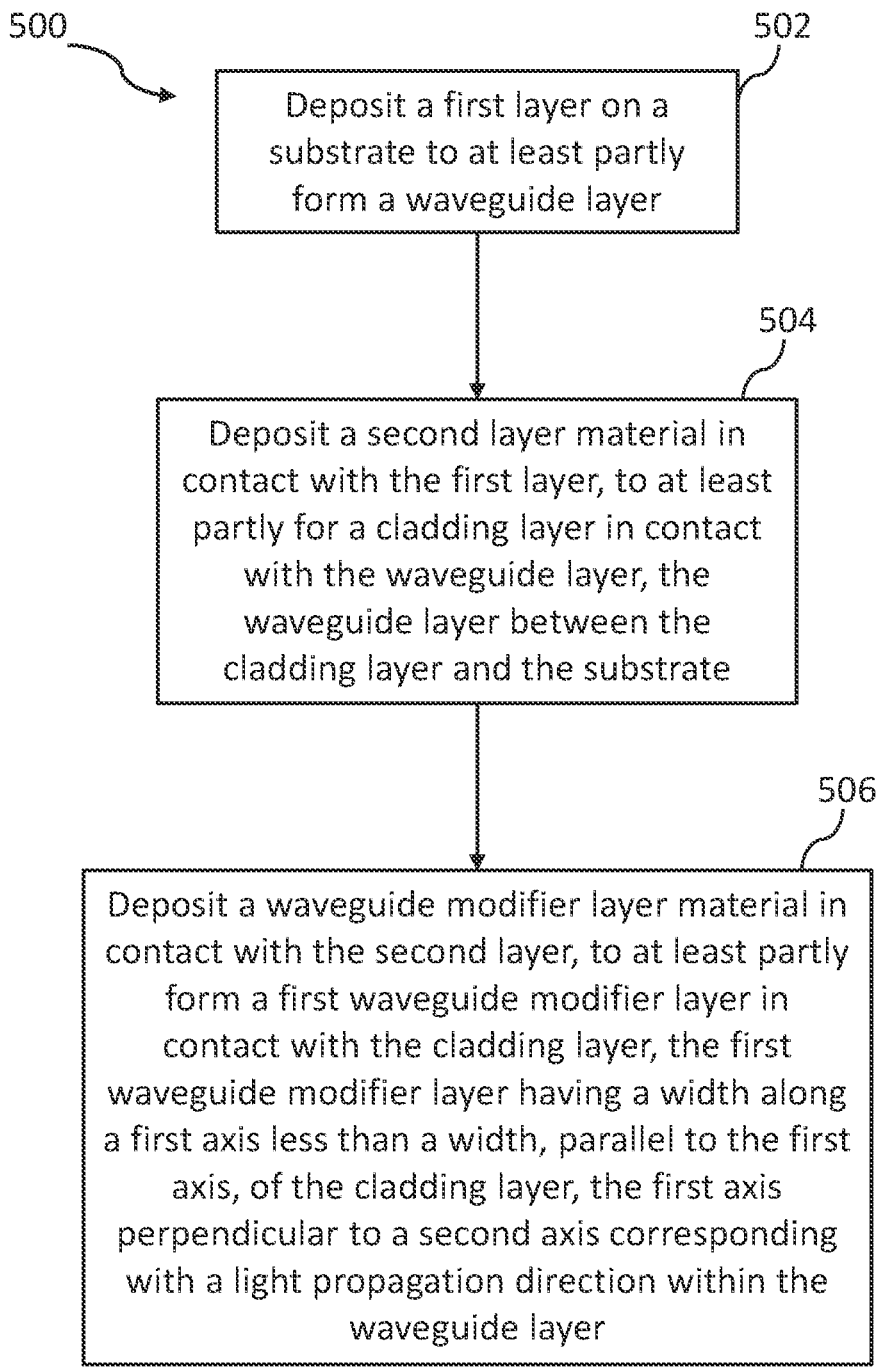
FIG. 5 is a flow diagram illustrating a method of manufacturing a waveguide structure according to examples.

FIG. 5 is a flow diagram illustrating a method 500 of manufacturing a waveguide structure, such as a waveguide structure according to any of the examples described above. The method 500 is described with reference to the above described examples of waveguide structures. The substrate is for example the substrate 102. At block 502, a first layer is deposited on a substrate to at least partly form the waveguide layer 104 on the substrate 102. For example, the first layer comprises the material of the waveguide layer 104 which is deposited on the substrate 102 to at least partly form the waveguide layer 104. In examples where the waveguide layer 104 comprises more than one material (e.g. in the case of the waveguide layer 104 comprising a plurality of sub-layers such as a (Al)InGaAs(P)/(Al)InGaAs(P) multiple quantum well structure) the relevant materials are e.g. deposited in the appropriate order to at least partly form the waveguide layer 104.

At block 504 of the method 500, a second layer material is deposited in contact with the first layer to at least partly form the cladding layer 106 in contact with the waveguide layer 104. The second layer material is, for example, the material comprised in the cladding layer 106 described above. For example, the second layer material is the second material referred to above in the context of the waveguide structures 100 and 400. The second layer material is hereafter referred to as the second material. The second material is deposited such that, once formed, the waveguide layer 104 is between the cladding layer 106 and the substrate 102.

At block 506, a waveguide modifier layer material is deposited in contact with the second layer. The waveguide modifier layer material is, for example, the first material described above. The waveguide modifier layer material is hereafter referred to as the first material. The first material is deposited to at least partly form the first waveguide modifier layer 110 in contact with the cladding layer 106 such that the first waveguide modifier layer 110 has a width along the first axis 114 (which is perpendicular to the second axis 202 corresponding with the light propagation direction within the waveguide layer 104, as described above) less than a width, parallel to the first axis 114, of the cladding layer 106.

Figure 6:
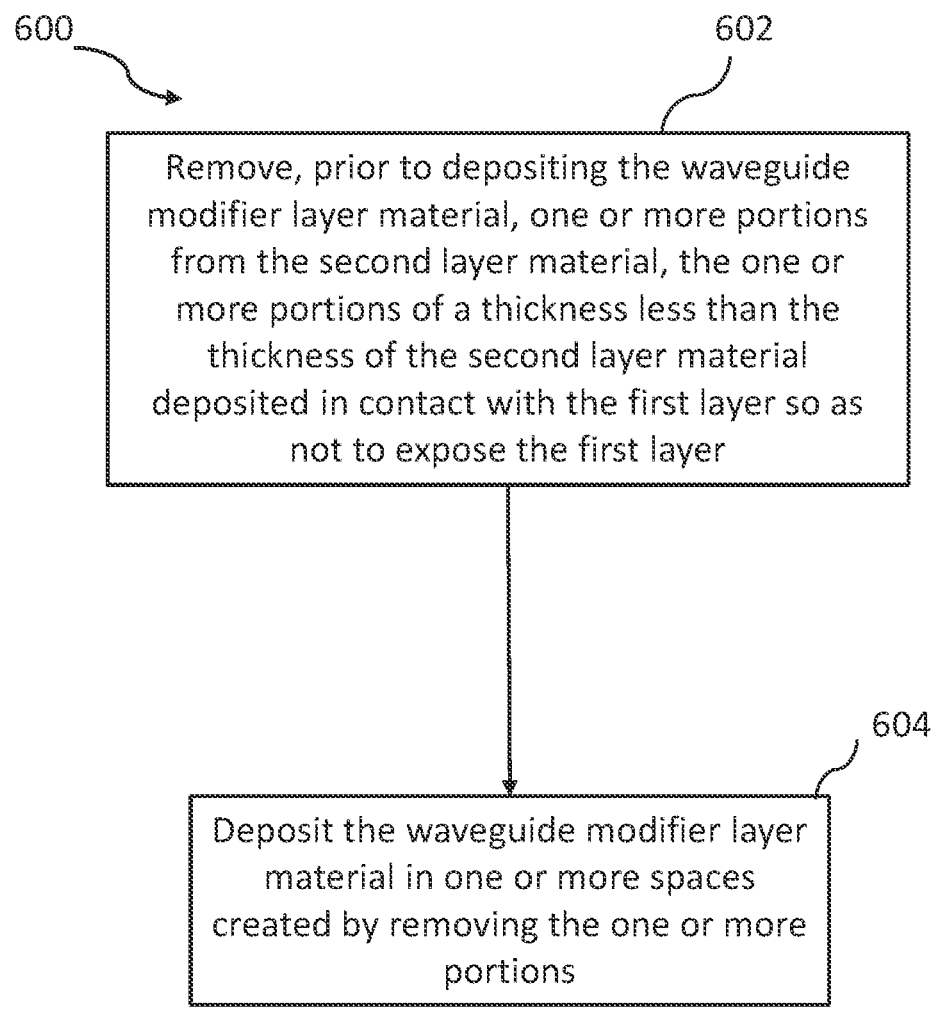
FIG. 6 is a flow diagram illustrating a first set of steps as part of the method of manufacturing the waveguide structure according to examples.

FIG. 6 is a flow diagram illustrating more specific examples 600 of the method 500. Method 600 illustrates specific examples of at least partly forming the first waveguide modifier layer 110. In these examples, an amount of second material is deposited on the first layer such that the height of the second material equates substantially (within acceptable tolerances) to the height of the cladding layer 106 plus the height of the first waveguide modifier layer 110 (see FIG. 1). At block 602, prior to depositing the first material for the first waveguide modifier layer 110 (between blocks 504 and 506), one or more portions are removed from the second material. As used herein, a thickness of a layer is the dimension in a direction perpendicular to the first axis 114 and perpendicular to the second axis 202. The one or more portions that are removed have a thickness less than the thickness of the second material deposited in contact with the first layer. The thickness of the one or more portions that are removed is therefore such that the first layer is not exposed as a result of the removal of the one or more portions.

The thickness of the one or more removed portions is selected in accordance with the desired thickness of the first waveguide modifier layer 110. At block 604 of the method 600, the first material is deposited in one or more spaces created by removing the one or more portions of the second material. For example, the first material is deposited so that the thickness of the first material is substantially (within acceptable tolerances) the same as the thickness of the second material at a position from which the second material is not removed at block 602.

The number of portions of the second material that are removed depends upon the number of desired waveguide modifier layers. The size(s), shape(s) and arrangement of the portions of the second material that are removed depends on the desired size(s), shape(s) and arrangement of the waveguide modifier layers. In examples in which the waveguide structure comprises only the first waveguide modifier layer 110, one portion of the second material is removed and the corresponding space filled with the first material.

Figure 7:
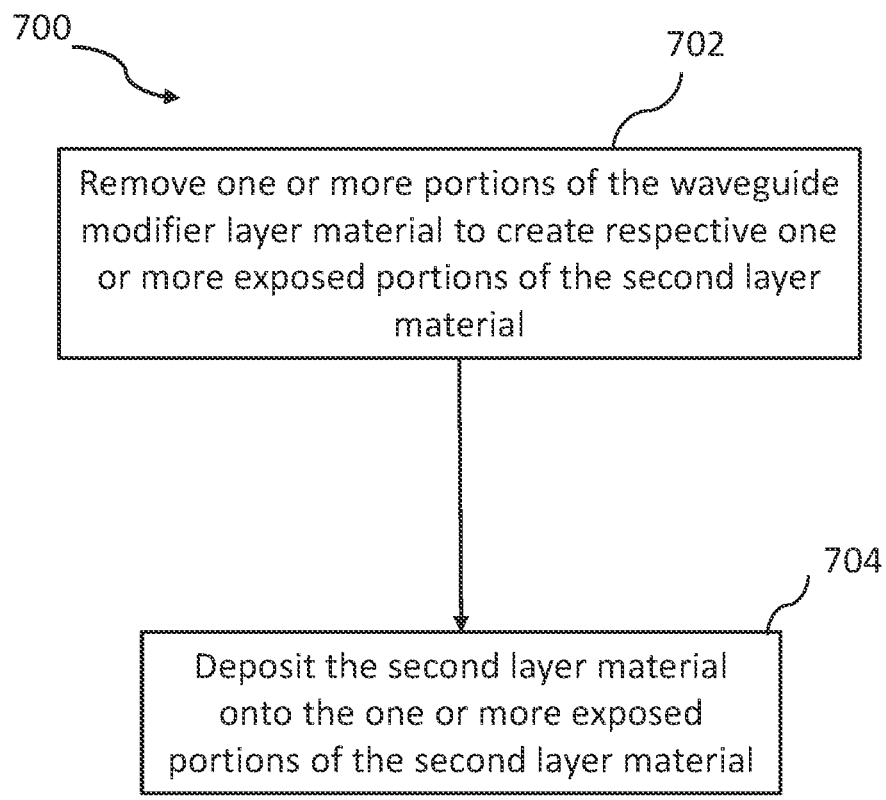
FIG. 7 is a flow diagram illustrating a second set of steps as part of the method of manufacturing the waveguide structure according to examples.

FIG. 7 is a flow diagram illustrating more specific examples 700 of the method 500. The examples according to the method 700 are alternatives to the examples according to the method 600 described with reference to FIG. 6. Method 700 illustrates specific examples of at least partly forming the first waveguide modifier layer 110. In these examples, the first material is deposited over the entire top surface of the second material that was deposited in contact with the first layer. At block 702 of the method 700, one or more portions of the first material (the waveguide modifier layer material) are removed to create respective one or more exposed portions of the second material (the second layer material). At block 704 of the method 700, the second material is deposited onto the one or more exposed portions of the second layer material.

Either of the methods 600 of FIG. 6 and 700 of FIG. 7 are used to at least partly form the portion of the waveguide structure comprising the waveguide modifier layers with the second material therebetween. As with the method 600, in the method 700, the number, size, shape and arrangement of the one or more portions of the waveguide layer material (the first material) that are removed depends upon the desired number, size, shape and arrangement of waveguide modifier layers according to an application of the waveguide structure.

In some examples where the top surfaces of the waveguide modifier layers are covered with a material, the second layer material is deposited on the first material to at least partly form the top section of the waveguide structure comprising the second material.

In the above description with reference to FIGS. 6 and 7, reference is made to at least partly forming layers. In some examples, a layer referred to in this manner is simply formed by depositing the relevant material. For example, the cladding layer 106 is formed simply by depositing the second material without requiring further steps. In other examples, further steps are performed to complete the formation of a layer (for example, a curing step, etc.). In some examples, the further steps to complete the formation of a layer are performed before further material is deposited on top of the layer in question. In other examples, the further steps to complete the formation of a layer are performed after further material is deposited on top of the layer in question.

In order to manufacture a deep waveguide structure, such as the waveguide structure 100, material is removed to form sides of the waveguide structure parallel to the second axis 202, starting from the top section, and beyond a top surface of the substrate 102. In order to manufacture a shallow waveguide structure, such as the waveguide structure 400, material is removed to form sides of the waveguide structure parallel to the second axis 202, starting from the top section, and at least until a top surface of the waveguide layer 104-4 without removing all of the waveguide layer 104-4 down to its bottom surface (for example, material is removed until slightly below the top surface of the waveguide layer 104-4).

As the skilled person will appreciate, various techniques can be used to deposit the material in accordance with the described examples. Such techniques include, for example, chemical vapour deposition techniques such as metalorganic vapour-phase epitaxy (MOVPE) or molecular beam epitaxy (MBE). The skilled person will appreciate that etching techniques are used to remove material in accordance with the described examples. For example, a dry etching technique or a wet etching technique is used. For example, a patterned mask is used.

In some examples, there is provided a PIC comprising the waveguide structure according to any of the described examples.

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A waveguide structure comprising:
    a substrate;
    a waveguide layer on the substrate;
    a cladding layer in contact with a first side of the waveguide layer, the waveguide layer between the cladding layer and the substrate;
    a first waveguide modifier layer comprising a first material for modifying a waveguide function of the waveguide layer, the first waveguide modifier layer in contact with the cladding layer and having a width along a first axis less than a width, parallel to the first axis, of the cladding layer, the first axis perpendicular to a second axis corresponding with a light propagation direction within the waveguide layer; and
    a second waveguide modifier layer on the first axis comprising the first material for modifying the waveguide function of the waveguide layer, the first and the second waveguide modifier layers on the first axis in contact with the cladding layer and spaced apart from one another.

2. The waveguide structure according to claim 1 comprising at least one from:
    (i) a second material in contact with one or more portions of a side of the cladding layer overlapping the first side of the waveguide layer, the one or more portions not in contact with the first material;
    ii) a second material in contact with one or more portions of a side of the cladding layer overlapping the first side of the waveguide layer, the one or more portions not in contact with the first material, wherein the cladding layer comprises the second material; and
    iii) a second material in contact with one or more portions of a side of the cladding layer overlapping the first side of the waveguide layer, the one or more portions not in contact with the first material, wherein the second material is in contact with a side of the first waveguide modifier layer overlapping the first side of the waveguide layer.

3. The waveguide structure according to claim 1, wherein:
    the first waveguide modifier layer has a width along a third axis, the width along the third axis different to the width of the first waveguide modifier layer along the first axis, the third axis perpendicular to the second axis and spaced from the first axis.

4. The waveguide structure according to claim 1, comprising at least one from:
  (i) a third waveguide modifier layer comprising the first material for modifying the waveguide function of the waveguide layer and in contact with the cladding layer, the third waveguide modifier layer located on a third axis perpendicular to the second axis and spaced from the first axis;
  (ii) a third waveguide modifier layer comprising the first material for modifying the waveguide function of the waveguide layer and in contact with the cladding layer, the third waveguide modifier layer located on a third axis perpendicular to the second axis and spaced from the first axis, wherein a width of the first waveguide modifier layer is substantially the same as a width of the third waveguide modifier layer;
  (iii) a third waveguide modifier layer comprising the first material for modifying the waveguide function of the waveguide layer and in contact with the cladding layer, the third waveguide modifier layer located on a third axis perpendicular to the second axis and spaced from the first axis, wherein the width of the first waveguide modifier layer is different to the width of the third waveguide modifier layer; and
  (iv) a fourth waveguide modifier layer on the third axis comprising the first material for modifying the waveguide function of the waveguide layer, the third and the fourth waveguide modifier layers in contact with the cladding layer and spaced apart from one another.

5. A photonic integrated circuit comprising the waveguide structure according to claim 1.

6. The waveguide structure according to claim 1, wherein:
  the first material modifies the effective refractive index of the waveguide layer; and/or
  the distance between the waveguide layer and the first waveguide modifier layer is according to a desired magnitude by which the waveguide function of the waveguide layer is to be modified.

7. A method of manufacturing a waveguide structure, the method comprising:
  depositing a first layer on a substrate to at least partly form a waveguide layer on the substrate;
  depositing a second layer material in contact with the first layer, to at least partly form a cladding layer in contact with the waveguide layer, the waveguide layer between the cladding layer and the substrate; and
  depositing a waveguide modifier layer material in contact with the second layer, to at least partly form a first waveguide modifier layer in contact with the cladding layer, the first waveguide modifier layer material for modifying a waveguide function of the waveguide layer, the first waveguide modifier layer having a width along a first axis less than a width, parallel to the first axis, of the cladding layer, the first axis perpendicular to a second axis corresponding with a light propagation direction within the waveguide-layer layer; wherein the method comprises
  removing, prior to depositing the waveguide modifier material, one or more portions from the second layer material, the one or more portions of a thickness less than the thickness of the second layer material deposited in contact with the first layer so as not to expose the first layer; and
  depositing the waveguide modifier layer material in one or more spaces created by removing the one or more portions.

8. The method according to claim 7 comprising:
  depositing the second layer material on the waveguide modifier layer material to at least partly form a top section of the waveguide structure comprising the second layer material.

9. The method according to claim 8 comprising:
  removing material to form sides of the waveguide structure parallel to the second axis, starting from the top section, and beyond a top surface of the substrate; or
  removing material to from sides of the waveguide structure parallel to the second axis, starting from the top section, and at least until a top surface of the waveguide layer, without removing all of the waveguide layer down to its bottom surface.

10. A waveguide structure comprising:
  a substrate;
  a waveguide layer on the substrate;
  a cladding layer in contact with a first side of the waveguide layer, the waveguide layer between the cladding layer and the substrate;
  a first waveguide modifier layer comprising a first material for modifying a waveguide function of the waveguide layer, the first waveguide modifier layer in contact with the cladding layer and having a width along a first axis less than a width, parallel to the first axis, of the cladding layer, the first axis perpendicular to a second axis corresponding with a light propagation direction within the waveguide layer; and
  a further waveguide modifier layer comprising the first material for modifying the waveguide function of the waveguide layer and in contact with the cladding layer, the further waveguide modifier layer located on a third axis perpendicular to the second axis and spaced from the first axis.

11. The waveguide structure according to claim 10, wherein:
  (i) a width of the first waveguide modifier layer is substantially the same as a width of the further waveguide modifier layer; and/or
  (ii) the width of the first waveguide modifier layer is different to the width of the further waveguide modifier layer.

12. The waveguide structure according to claim 10 comprising at least one from:
  (i) a second material in contact with one or more portions of a side of the cladding layer overlapping the first side of the waveguide layer, the one or more portions not in contact with the first material;
  (ii) a second material in contact with one or more portions of a side of the cladding layer overlapping the first side of the waveguide layer, the one or more portions not in contact with the first material, wherein the cladding layer comprises the second material; and
  (iii) a second material in contact with one or more portions of a side of the cladding layer overlapping the first side of the waveguide layer, the one or more portions not in contact with the first material, wherein the second material is in contact with a side of the first waveguide modifier layer overlapping the first side of the waveguide layer.

13. The waveguide structure according to claim 10, wherein:
  the first material modifies the effective refractive index of the waveguide layer; and/or
  the distance between the waveguide layer and the first waveguide modifier layer is according to a desired magnitude by which the waveguide function of the waveguide layer is to be modified; and/or the first waveguide modifier layer has a width along a third axis, the width along the third axis different to the width of the first waveguide modifier layer along the first axis, the third axis perpendicular to the second axis and spaced from the first axis.

14. A photonic integrated circuit comprising the waveguide structure according to claim 10.

15. A waveguide structure comprising:
a substrate;
a waveguide layer on the substrate;
a cladding layer in contact with a first side of the waveguide layer, the waveguide layer between the cladding layer and the substrate;
a first waveguide modifier layer comprising a first material for modifying a waveguide function of the waveguide layer, the first waveguide modifier layer in contact with the cladding layer and having a width along a first axis less than a width, parallel to the first axis, of the cladding layer, the first axis perpendicular to a second axis corresponding with a light propagation direction within the waveguide layer; and
a second material in contact with one or more portions of a side of the cladding layer overlapping the first side of the waveguide layer, the one or more portions not in contact with the first material.

16. The waveguide structure according to claim 15,
(ii) wherein the cladding layer comprises the second material; and/or
(iii) wherein the second material is in contact with a side of the first waveguide modifier layer overlapping the first side of the waveguide layer.

17. The waveguide structure according to claim 15, wherein:
the first material modifies the effective refractive index of the waveguide layer; and/or
the distance between the waveguide layer and the first waveguide modifier layer is according to a desired magnitude by which the waveguide function of the waveguide layer is to be modified; and/or
the first waveguide modifier layer has a width along a third axis, the width along the third axis different to the width of the first waveguide modifier layer along the first axis, the third axis perpendicular to the second axis and spaced from the first axis.

18. A photonic integrated circuit comprising the waveguide structure according to claim 15.

19. A method of manufacturing a waveguide structure, the method comprising:
depositing a first layer on a substrate to at least partly form a waveguide layer on the substrate;
depositing a second layer material in contact with the first layer, to at least partly form a cladding layer in contact with the waveguide layer, the waveguide layer between the cladding layer and the substrate; and
depositing a waveguide modifier layer material in contact with the second layer, to at least partly form a first waveguide modifier layer in contact with the cladding layer, the first waveguide modifier layer material for modifying a waveguide function of the waveguide layer, the first waveguide modifier layer having a width along a first axis less than a width, parallel to the first axis, of the cladding layer, the first axis perpendicular to a second axis corresponding with a light propagation direction within the waveguide layer; wherein the method comprises
removing one or more portions of the waveguide modifier layer material to create respective one or more exposed portions of the second layer material; and
depositing the second layer material onto the one or more exposed portions of the second layer material.

20. The method according to claim 19 comprising:
(i) depositing the second layer material on the waveguide modifier layer material to at least partly form a top section of the waveguide structure comprising the second layer material; or
(ii) depositing the second layer material on the waveguide modifier layer material to at least partly form a top section of the waveguide structure comprising the second layer material; and
removing material to form sides of the waveguide structure parallel to the second axis, starting from the top section, and beyond a top surface of the substrate; or
(iii) depositing the second layer material on the waveguide modifier layer material to at least partly form a top section of the waveguide structure comprising the second layer material; and
removing material to from sides of the waveguide structure parallel to the second axis, starting from the top section, and at least until a top surface of the waveguide layer, without removing all of the waveguide layer down to its bottom surface.

* * * * *